(12) United States Patent
Young et al.

(10) Patent No.: US 9,041,930 B1
(45) Date of Patent: May 26, 2015

(54) DIGITAL PATHOLOGY SYSTEM

(75) Inventors: Scott Young, Soquel, CA (US); Eliezer Rosengaus, Palo Alto, CA (US); Ashok Kulkarni, San Jose, CA (US)

(73) Assignee: KLA-Tencor Corporation, Milpitas, CA (US)

(*) Notice: Subject to any disclaimer, the term of this patent is extended or adjusted under 35 U.S.C. 154(b) by 950 days.

(21) Appl. No.: 13/112,956

(22) Filed: May 20, 2011

Related U.S. Application Data

(60) Provisional application No. 61/346,744, filed on May 20, 2010, provisional application No. 61/346,747, filed on May 20, 2010.

(51) Int. Cl.
*G01N 21/25* (2006.01)
*G01J 3/51* (2006.01)
*G01J 3/02* (2006.01)
*G01J 3/28* (2006.01)

(52) U.S. Cl.
CPC .... *G01J 3/51* (2013.01); *G01J 3/02* (2013.01); *G01J 3/513* (2013.01); *G01J 3/2803* (2013.01)

(58) Field of Classification Search
USPC .................. 356/300–334, 417–419
See application file for complete search history.

(56) References Cited

U.S. PATENT DOCUMENTS

2009/0213362 A1* 8/2009 Nakamura et al. .............. 356/72

* cited by examiner

*Primary Examiner* — Abdullahi Nur
(74) *Attorney, Agent, or Firm* — Suiter Swantz pc llo

(57) ABSTRACT

The present invention may include an illumination source; a TDI sensor having a plurality of rows of TDI pixels, wherein each of the TDI pixels have a 1:1 aspect ratio; a multicolor filter contacted to the surface of the TDI sensor, wherein the multicolor filter has alternating sections of a first color filter, a second color filter, and at least a third color, wherein adjacent rows of TDI pixels are grouped in order to form a plurality of rows of integrated multicolor pixels; an objective having a first end positioned proximate to the specimen; a second lens configured to focus light from the image path onto the TDI sensor; and an anamorphic optics element configured to magnify an image of the one or more specimens such that the image is magnified by a factor of three along a direction orthogonal to an integrating direction of the TDI sensor.

22 Claims, 12 Drawing Sheets

SIDE VIEW

DIGITAL PATHOLOGY SYSTEM

CROSS-REFERENCE TO RELATED APPLICATION

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a regular (non-provisional) patent application of United States Provisional Patent Application entitled DIGITAL PATHOLOGY METHODS AND APPARATUS, naming Scott Young, Eliezer Rosengaus, and Ashok Kulkarni as inventors, filed May 20, 2010, Application Ser. No. 61/346,747.

For purposes of the USPTO extra-statutory requirements, the present application constitutes a regular (non-provisional) patent application of United States Provisional Patent Application entitled DIGITAL PATHOLOGY METHODS AND APPARATUS, naming Scott Young, Eliezer Rosengaus, and Ashok Kulkarni as inventors, filed May 20, 2010, Application Ser. No. 61/346,744.

TECHNICAL FIELD

The present invention generally relates to a system for digital pathology, and more particularly to a digital pathology system with autofocusing or color capture capabilities.

BACKGROUND

Pathology is the study and diagnosis of disease through examination of cells, clusters of cells, tissues, organs, and body fluids. In a typical setting a pathologist may diagnose and characterize a given disease by examining a sample (e.g., tissue sample) removed from a patient. Tissue samples are often prepared by slicing a given tissue sample into thin slices. These thin slices are then mounted onto glass slides, which may be treated with a reagent or stain in order to improve visible contrast. In a typical setting, the pathologist then analyzes the tissue sample using a microscope system. In this setting, the pathologist may manually scan the tissue sample at various locations and various magnifications in order to identify abnormal cells or cell clusters.

Several factors are critical to a pathologist's ability to effectively and efficiently analyze tissue specimens using digital pathology system. Two of these factors include the ability to maintain image focus during a review session or image capture, and the ability to efficiently capture full color digital images of a tissue specimen. In traditional autofocusing schemes, autofocus is accomplished by capturing several images at different Z offsets at various widely spaced sites. The sharpness of each image is then determined and the system returns to the Z offset providing the best focus. The process is time consuming and significantly limits the speed of capturing best focus imagery data. It is therefore advantageous to develop a system which increases the speed at which autofocus is obtained.

Furthermore, traditional multicolor TDI systems utilize three separate TDI cameras. Each TDI camera is outfitted with a single color, such as red, green, or blue. It is, therefore, advantageous to develop a multicolor TDI system which reduces the need for multiple TDI cameras, making TDI image capture more cost effective.

SUMMARY

An autofocusing digital pathology system is disclosed. In one aspect, a system may include, but is not limited to, an illumination source configured to illuminate one or more specimens; an objective having a first end positioned proximate to the one or more specimens, wherein the objective is configured to direct at least a portion of light emanating from the one or more specimens along an image path to one or more image sensors; an autofocus controller; a specimen Z height motor communicatively coupled to the autofocus controller; a first beam splitter configured to redirect a portion of light along the image path onto a first focus path toward a first sharpness sensor; a second beam splitter configured to redirect a portion of light along the first focus path onto a second focus path toward a second sharpness sensor; a first lens configured to focus light of the first focal path to a first pupil plane of the first sharpness sensor; a second lens configured to focus light of the second focal path to a second pupil plane of the second sharpness sensor, wherein the first pupil plane is offset in Z position by a selected distance relative to a predetermined best focus position along a first direction, wherein the second pupil plane is offset in Z position by the selected distance relative to the predetermined best focus position along a second direction, wherein the second direction is opposite to the first direction; a first apodizing filter located at the first pupil plane; a second apodizing filter located at the second pupil plane, wherein the first apodizing filter and the second apodizing filter are configured to operate as high pass filters; a first light sensor arranged to collect light transmitted by the first apodizing filter; and a second light sensor arranged to collect light transmitted by the second apodizing filter, wherein the first light sensor and the second light sensor are communicatively couple to the autofocus controller, wherein the first light sensor is configured to transmit a signal indicative of measured intensity of the light via the first light sensor to the autofocus controller, wherein the second light sensor is configured to transmit a signal indicative measured intensity of the light via the second light sensor to the autofocus controller, wherein the autofocus controller is configured to determine the best object Z focus height by interpolating the sharpness versus Z offset data constructed utilizing the measured light intensity from the first light sensor and second light sensor, wherein the autofocus controller is configured to control the object focus by controlling the Z height motor in order to maintain focus error below a selected threshold.

A digital pathology system suitable for color image capture is disclosed. In one aspect, a system may include, but is not limited to, an illumination source configured to illuminate one or more specimens; a time delayed integration (TDI) sensor having a plurality of rows of TDI pixels, wherein each of the TDI pixels have a substantially one-to-one aspect ratio; a multicolor filter operably contacted to a surface of the TDI sensor, wherein the multicolor filter has alternating sections of a first color filter, a second color filter, and at least a third color, wherein each of the alternating sections of the multicolor filter is substantially coextensive along at least one dimension with at least one of the rows of the TDI pixels, wherein adjacent rows of TDI pixels are grouped in order to form a plurality of rows of integrated multicolor pixels; an objective having a first end positioned proximate to the one or more specimens, wherein the objective is configured to direct at least a portion of light emanating from the one or more specimens along an image path to the TDI sensor; and a second lens configured to focus light from the image path onto a portion of the TDI sensor; an anamorphic optics element configured to magnify an image of the one or more specimens such that the image is magnified by a factor of three along a direction orthogonal to an integrating direction of the TDI sensor.

In another aspect, a system may include, but is not limited to, an illumination source configured to illuminate one or more specimens; a time delayed integration (TDI) sensor having a plurality of rows of TDI pixels, wherein each of the TDI pixels have a substantially three-to-one aspect ratio, wherein the dimension of each of the TDI pixels along an integrating direction of the TDI sensor is three times larger than the dimension along a direction orthogonal to the integrating direction; a multicolor filter operably contacted to a surface of the TDI sensor, wherein the multicolor filter has alternating sections of a first color filter, a second color filter, and at least a third color, wherein each of the alternating sections of the multicolor filter is substantially coextensive along at least one dimension with at least one of the rows of the TDI pixels, wherein adjacent rows of TDI pixels are grouped in order to form a plurality of rows of integrated multicolor pixels; an objective having a first end positioned proximate to the one or more specimens, wherein the objective is configured to direct at least a portion of light emanating from the one or more specimens along an image path to the TDI sensor; and a second lens configured to focus light from the image path onto a portion of the TDI sensor.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the disclosure may be better understood by those skilled in the art by reference to the accompanying figures in which:

FIG. 2D illustrates a schematic side view of a multicolor filter connected to the surface of time delay integration (TDI) sensor in accordance with the present invention.

DETAILED DESCRIPTION OF THE INVENTION

Reference will now be made in detail to the subject matter disclosed, which is illustrated in the accompanying drawings.

Referring generally to FIGS. 1A through 1D, a system 100 for digital pathology with autofocusing capabilities is described in accordance with the present invention. Employing digital pathology with autofocusing capabilities provides for the simultaneous control of focus and image capture, lessening the time required for an imaging process. Moreover, simultaneous focus and image capture operation may lessen electronic and mechanical drift within an implementing system. The present invention is directed toward a digital pathology system with autofocusing capabilities accomplished utilizing multiple Z planes equipped with sharpness sensors for determining best focus during image capture.

Figure 1A:
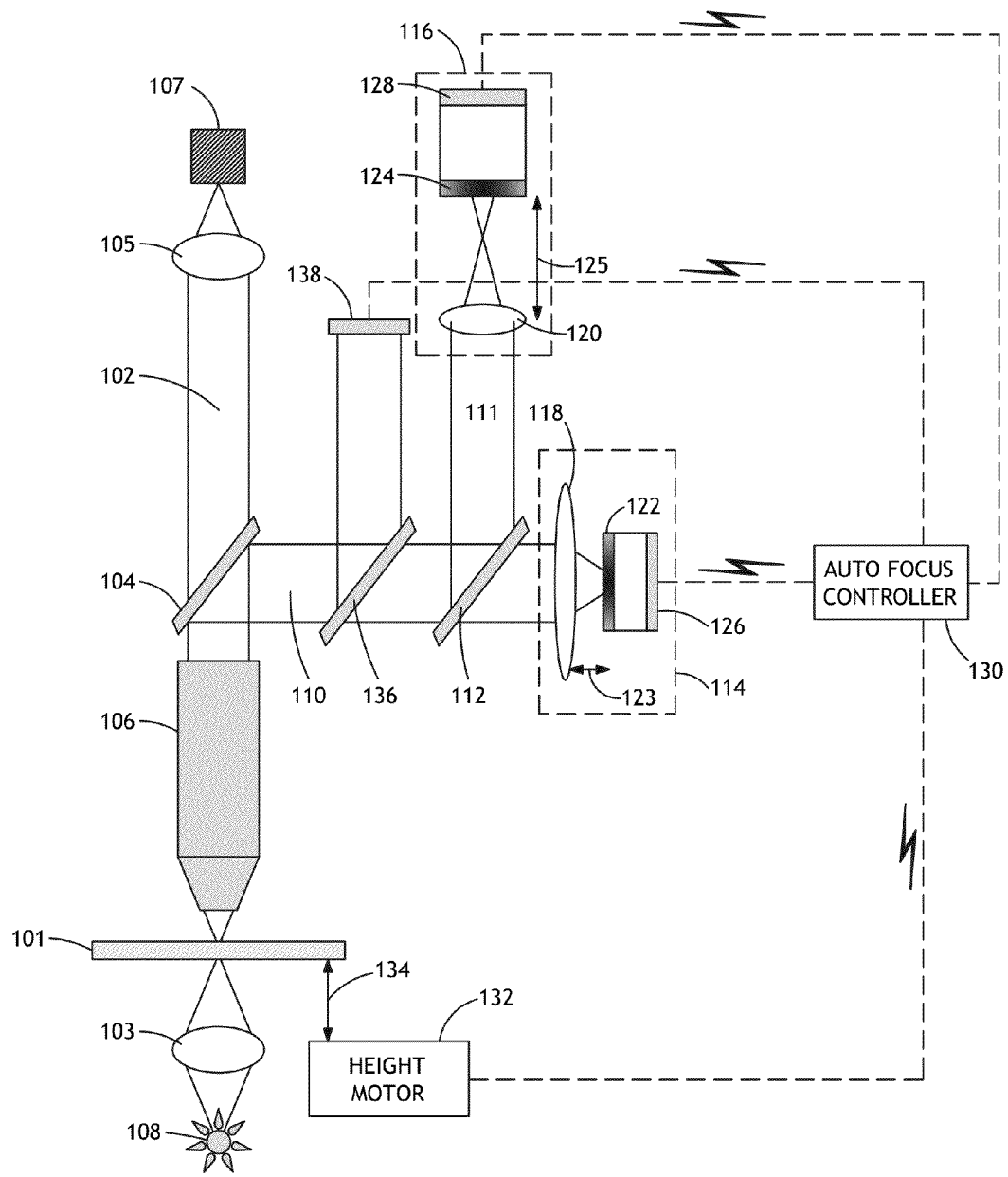
FIG. 1A illustrates a block diagram of an autofocusing digital pathology system in accordance with the present invention.

Referring now to FIG. 1A, the system 100 may include an illumination source 108, an illumination condenser 103, an objective 106, and an imaging lens 105 configured to focus image path 102 light onto an image sensing device 107. The illumination source 108 of the present invention may include any illumination source known in the art. The illumination source 108 of the present invention may include, but is not limited to, a bright field illumination system (e.g., utilizing a tissue sample sectioned and mounted on a transparent slide), a dark field illumination system, or a partial oblique illumination system. In one embodiment, the illumination source 108 may include a light source. For example, the light source may be configured to emit broadband light. For instance, the broadband light source may include, but is not limited to, a while light source. By way of another example, the light source may be configured to emit narrow band or monochromatic light. For instance, the light source may include, but is not limited to, a laser or a light emitting diode (LED). Further, narrow band or monochromatic light source may include, but is not limited to, a blue light source, a green light source, or a red light source. The selected wavelength of the light source may depend, among other things, upon measurement requirements and/or specimen features.

The illumination condenser 103 of the present invention may include any illumination condenser known in the art. In a general sense, the illumination serves to concentrate light from the illumination source 10 and direct the light through the specimen 101 and objective 106. The illumination condenser 103 may include, but is not limited to, an Abbe condenser, an Aplanatic condenser, an Achromatic condenser, or an Aplanatic-achromatic condenser. In the digital pathology setting, the illumination condenser 103 may direct from the illumination source 108 through a tissue specimen 101 mounted on a glass side and through the objective 106. Tissue samples are often prepared by slicing a given tissue sample into thin slices. These thin slices are then mounted onto glass slides, which may be treated with a reagent or stain in order to improve visible contrast.

The objective 106 of the present invention may include any objective and known in the art. For example, the objective 106 may include, but is not limited to, a catadioptric objective. The objective 106 may be situated such that a first end is located proximate to one or more specimens 101. Further, the objective 106 should be configured to direct light emanating from the specimen 101 (i.e., light transmitting through or light reflecting from the specimen) along an image path 102 to one or more image sensor 107. Upon leaving the objective 106, light emanating from the specimen may be focused to an image sensor 207 utilizing one or more imaging lenses 105. Any known imaging lens 105 known in the art is suitable form implementation in the present invention. For example, any known imaging lens 105 suitable for focusing light from the image path 102 onto the surface of the image sensor 107 is suitable for implementation in the present invention.

Referring again to FIG. 1A, the system 100 may include a first beam splitter 104 configured to split the light beam emanating from the objective 106 along two paths. In a first aspect, the beam splitter 104 passes a substantial portion of the light from the objective 106 along the imaging path 102 to the image sensing device 107. In a second aspect, the beam splitter 104 redirects a portion of the light emanating from the objective 106 along a first focus path 110 toward a second beam splitter 112. It should be recognized that the intensity of the image path 102 light is substantially larger than the intensity of the first focus path 110 light following processing by beam splitter 104.

The system 100 may include a second beam splitter 112 configured to split the first focal path 110 light beam along two paths. In a first aspect, the beam splitter 112 passes a portion of the light from the first focus path 110 toward a first sharpness sensor 114. In a second aspect, the beam splitter 112 redirects a portion of the light of the first focus path 110 along a second focus path 111 toward a second sharpness sensor 116. It should be recognized that the intensity of the first focus path light following processing by beam splitter 112 is approximately the same as the intensity of the second focus path 111 light following processing by beam splitter 112.

Referring again to FIG. 1A, the system 100 may include a first sharpness sensor 114 and a second sharpness sensor 116. The first sharpness sensor 114 may include a lens 118, a first apodizing filter 122, and a first light sensor 126. Similarly, the second sharpness sensor 116 may include a second lens 120, a second apodizing filter 124, and a second light sensor 128.

The first lens 118 of the first sharpness sensor 114 may be configured to focus light from the first focus path 110 to a first pupil plane of the sharpness sensor 114. The second lens 120 of the second sharpness sensor 116 may be configured to focus light from the second focus path 111 to a second pupil plane of the second sharpness sensor. In a first aspect, the first pupil plane may have a first offset 123 in Z position of a fixed distance from a predetermined best focus position of the system. In a second aspect, the second pupil plane may have a second offset 125 in Z position of the same fixed distance from the predetermined best focus position of the system, but in an opposite direction from the first pupil offset 123. One embodiment of this arrangement is illustrated in FIG. 1A. As shown in the example illustrated in FIG. 1A, the equal magnitude but opposite direction offsets result in the first pupil plane residing in front of the focal point associated with lens 118, while the second pupil plane resides behind the focal point associate with lens 120. As a result of this offset from the focal point, light emanating from the lenses 118 and 120 will fail to focus at the surface of the light sensors 126 and 128. Consequently, the measured light intensity at the light sensors 126 and 128 will, by design, be sub-optimal. Applicant notes that the above description should not be interpreted as a limitation but rather an illustration as the direction of the offsets 123 and 125 is arbitrary. The offsets need only be in opposite directions with respect to one another in order to satisfy the conditions of the present invention.

Figure 1B:
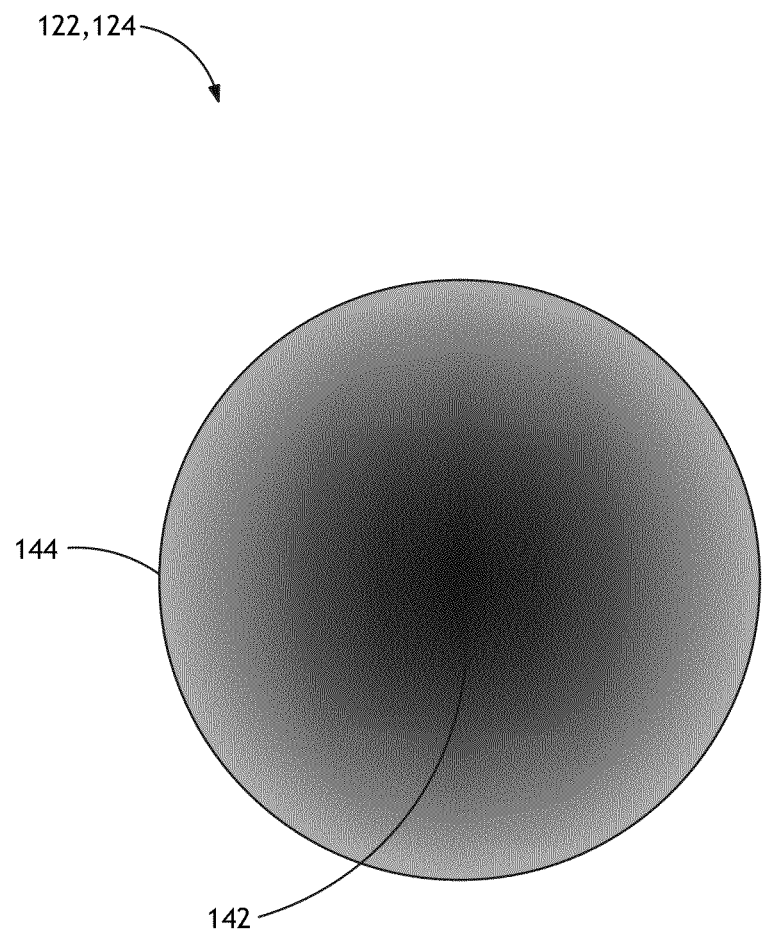
FIG. 1B illustrates a schematic frontal view of an apodizing filter in accordance with the present invention.

As shown in FIG. 1A, a first apodizing filter 122 of the first sharpness sensor 114 may be located at the first pupil plane, while a second apodizing filter 124 of the second sharpness sensor may be located at the second pupil plane. In a general sense, an optical apodizing filter is a filter constructed such that the transmission of light varies as a function from the center of symmetry of the filter to the edge of the filter. FIG. 1B illustrates a graphical representation of an apodizing filter 222,224 suitable for implementation in the present invention. The apodizing filter illustrated in FIG. 1B is configured to be opaque or nearly opaque at the center 142 of the filter. As a function of the distance from the center 142 to the edge of the filter, the opaqueness of the filter falls off. In this manner, the apodizing filters 122, 124 of the present invention are configured to display approximately zero light transmission at their centers 142 and full transmission at their edges 144. As a result of this configuration, the apodizing filters 122, 124 behave as high pass filters, filtering out much, if not all, of the low frequency contribution of the light being transmitted to the light sensors 126, 128. The manner in which the ability to transmit light through the apodizing filter falls off may vary depending on the specific filter selected. In a general sense, any optically capable apodizing filter known in the art may be implemented in the present invention. For example, the apodizing filters 122, 124 of the present invention may include apodizing filters having an opaqueness fall off function which is Gaussian in nature.

It should be recognized by those skilled in the art that the ability to enhance the relative contribution of high frequencies in a given light beam allows for efficient monitoring of system focus. High frequency signals are highly sensitive to quality of focus. For example, as an unfiltered system drifts out of focus, the high frequency components of the light quickly fall off and the system is left to pass through primarily low frequency components. By inserting a high pass filter (i.e., apodizing filters 122 and 124), a receiving light sensor (e.g., 126 or 128) becomes increasingly sensitive to the focus of the system as only (or nearly only) high frequency components are present in the single prior to entering the filter. When those high frequency components fall due to focus drift, the measured light intensity rapidly falls off to zero (or nearly zero).

The first sharpness sensor 114 includes a first light sensor 126 arranged to collect the light transmitted by the first apodizing filter 122, while the second sharpness sensor 116 includes a second light sensor 128 arranged to collect light transmitted by the second apodizing filter 124. More particularly, the first light sensor 126 may be configured to receive light emanating from lens 118 and passing through apodizing filter 122, while the second light sensor 128 may be configured to receive light emanating from lens 120 and passing through apodizing filter 124.

The light sensors 126 and 128 may include, but are not limited to, a single diode, a single pixel of a charge coupled device (CCD), or a single pixel of a time delay integration (TDI) CCD.

Referring again to FIG. 1A, the first light sensor 126 and 128 may be communicatively coupled to an autofocus controller 130 of the system 100. For example, upon acquiring a light intensity measurement, the first light sensor 126 may transmit (e.g., transmit via wireless RF signal or via wireline signal) one or more signals indicative of the intensity measurement to the autofocus controller 130. Similarly, upon acquiring a light intensity measurement, the second light sensor 128 may also transmit one or more signals indicative of the intensity measurement to the autofocus controller 130.

It is further contemplated herein that the system 100 may include at least one sharpness sensor in addition to the first sharpness sensor 114 and the second sharpness sensor 116. For example, the system 100 may include a third, fourth, or up to an including an Nth sharpness sensor. Moreover, each additional sharpness sensor may also include a pupil plane, an apodizing filter, and a light sensor, similar to those described above for the first 114 and second 116 sharpness sensors. In order to utilize the additional sharpness sensors the system 100 should further include additional beam splitters, which serve to produce additional splits from the first focus path 110. It should be recognized that by increasing the number of sharpness sensors the quality of best Z offset interpolation, discussed in more detail below, may be improved.

It is further contemplated herein that the system 100 may include one or more normalization light sensors 138. For example, as shown in FIG. 1A, a beam splitter 136 may act to split off a portion of the first focus path 110 beam and direct that portion to a normalization light sensor 138. The normalization light sensor 138 (e.g., diode, CCD, TDI-CCD) may be configured to measure the intensity of the first focus light path 110 prior to processing by the beam splitter 112. In this regard, the light intensities measured by light sensor 126 and light sensor 128 may be normalized utilizing the light intensity measured via the normalization sensor 138. Furthermore, the normalization light sensor 138 may be communicatively coupled to the autofocus controller 130. As such, the autofocus controller 130 may utilize the normalization data acquired with the normalization sensor 138 when analyzing the best focus Z offset.

Figure 1C:
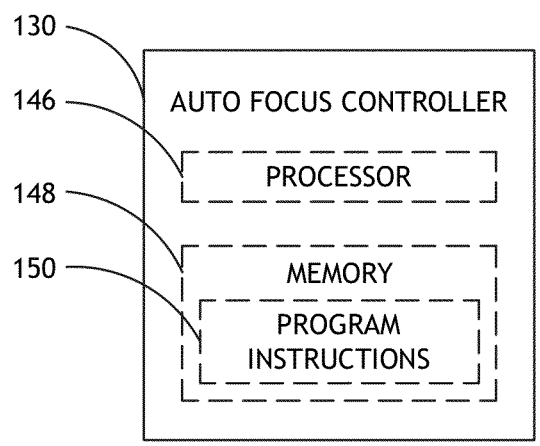
FIG. 1C illustrates a block diagram of an autofocus controller of an autofocusing digital pathology system in accordance with the present invention.

Referring now to FIG. 1C, the autofocus controller 130 may include one or more processors 146 (e.g., computer system) and a memory storage medium 148 (e.g., RAM). Further, the one or more processors 146 may run a set of pre-programmed instructions (i.e., computer program) which act to analyze the results of measurements taken by the first light sensor 126 and the second light sensor 128.

Referring now to FIGS. 1A through 1D, the autofocus controller 130 may determine the best object Z focus height by interpolating sharpness (e.g., intensity of high frequency light signal) versus Z offset data. For example, the sharpness versus Z offset data may be constructed by the processor 146 utilizing the measured light intensity from the first sensor 126 and the second sensor 128. Upon receiving the measured intensity data from first sensor 126 and second sensor 128, the processor 146 of the autofocus controller 130 may utilize a fitting algorithm (e.g., polynomial) to interpolate the sharpness versus Z offset data set. In this manner, the one or more processors 146 may run a set of pre-programmed instructions which act to execute the chosen interpolation algorithm. It should be noted that there are a large number of interpolation algorithms suitable for fitting the measured sharpness versus Z offset data. Examples of suitable interpolation methods include, but are not limited to, polynomial interpolation and spline interpolation.

In a further aspect, the autofocus controller 130 is communicatively coupled to a Z height motor 132. For example, upon analysis of the received data from the first light sensor 126 and the second light sensor 128, the autofocus controller 130 may transmit an instruction signal to the Z height motor 132 (e.g., stepper motor, piezoelectric actuator, and the like). The autofocus controller 130 acts to control the Z height motor 132 in order to maintain focus error below a selected threshold.

Figure 1D:
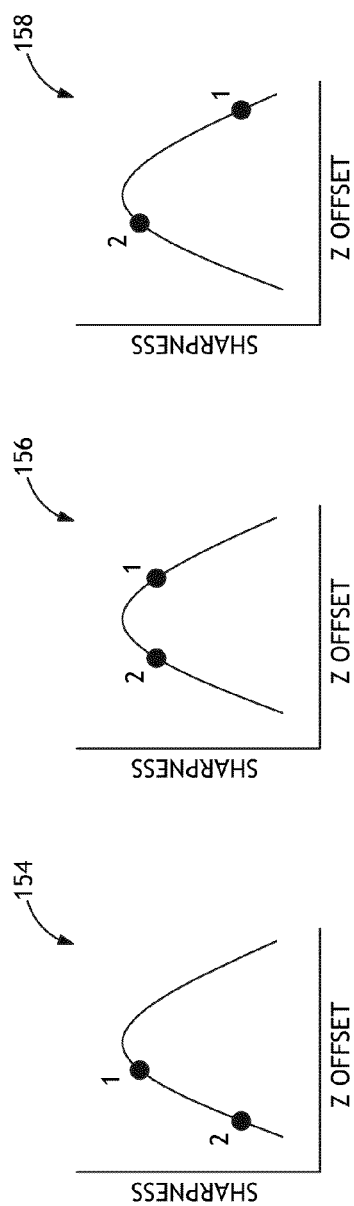
FIG. 1D illustrates a set of simulated sharpness versus Z offset interpolation results.

FIG. 1D illustrates a set 152 of interpolated sharpness versus Z offset measurement results. Graphs 154, 156, and 158 each illustrate measured and interpolated sharpness (i.e., high frequency light intensity) versus Z offset data. Points 1 and 2 in each graph indicate the relative values of the intensity signal measured at the first and second light sensor respectively. The solid curve indicates the interpolated data calculated by inputting the measured data and applying the interpolation process via the processor 146 of the autofocus controller 130. It is noted that the center of the interpolated curve represents the best focus Z offset position. It is also recognized that due to the manner of in which the first pupil and the second pupil are offset with respect to the predetermined best focus (i.e., best focus position resides directly between the first pupil Z position and the second pupil Z position) as described previously herein, the best focus configuration exists when data points 1 and 2 straddle the sharpness peak. This situation is observed in data set 156. Moreover, the autofocus controller 130 may act to maintain the configuration that produces the results observed in graph 156 by sending real-time instructions to the Z height motor 132. In the case of graph 154, the current focus of the system has drifted in such a way that the Z offset positions of the first and second pupil planes (measured relative to initial best focus) lead to a drop in high frequency pass (as focus drifter farther from sensor plane) to the sensor 128 and an increase in intensity at sensor 128 (as focus drifted closer to sensor plane). An analogous scenario is observed in graph 158. In response, the autofocus controller 130 may act to adjust the Z height 134 utilizing the Z height motor 132 until the Z error falls below and acceptable level.

At the beginning of image capture, the system 100 utilizes the most recent best focus Z offset. During the image capture process the autofocus controller 130 of the system 100 attempts to control the Z height utilizing the Z height motor in order to maintain the Z offset error within a maximum allowable Z offset error limit. In the event that the error limit is exceeded, the predetermined Z offset is recalled from memory and the image capture process is repeated.

While the preceding descriptive material has focused on a system 100 implementing an illumination source 210 in concert with various beam splitters to monitor sharpness at the first 126 and second 128 light sensors, it is further contemplated herein that a modulated monochromatic illumination source may be implemented in the context of the present invention. For example, a modulated illumination source at a specific wavelength may be added to the illumination path. By replacing the first beam splitter 104 with a diachroic (configured to reflect the specific wavelength) mirror or reflector, the diachroic mirror or reflector will reflect light having the specific wavelength along first focus path 110, while passing the remainder of the light emanating from the illumination source to the image sensor 207 along the image path 102. Moreover, the autofocus controller 130 may be configured to demodulate the signal received by the first 126 and second 128 light sensors, resulting in a low noise result.

Referring generally to FIGS. 2A through 2D, a system 200 suitable for multicolor digital pathology is described in accordance with the present invention. Employing multicolor digital pathology via a single TDI sensor provides for improved efficiency when compared to traditional RGB systems requiring multiple TDI sensors. The present invention is directed toward a multicolor digital pathology system implementing a single multicolor TDI sensor.

Figure 2A:
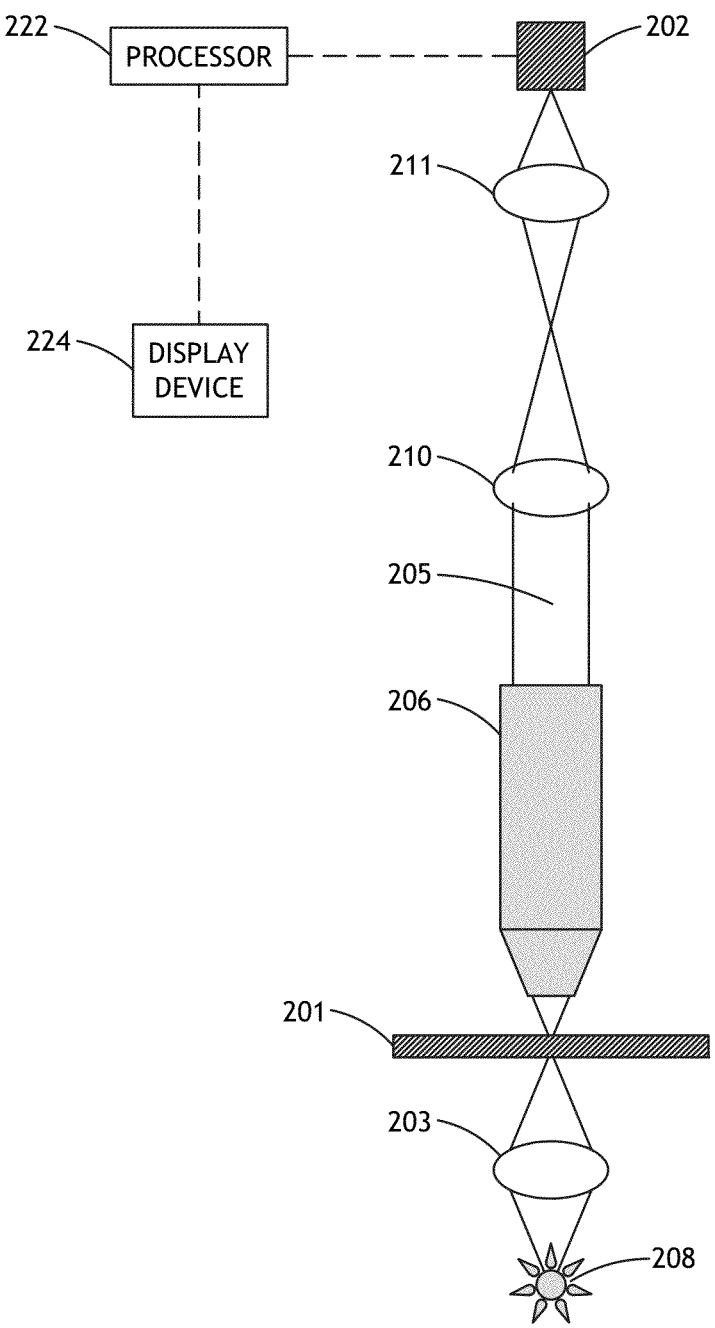
FIG. 2A illustrates a block diagram of a digital pathology system suitable for color image capture in accordance with the present invention.
Figure 2B:
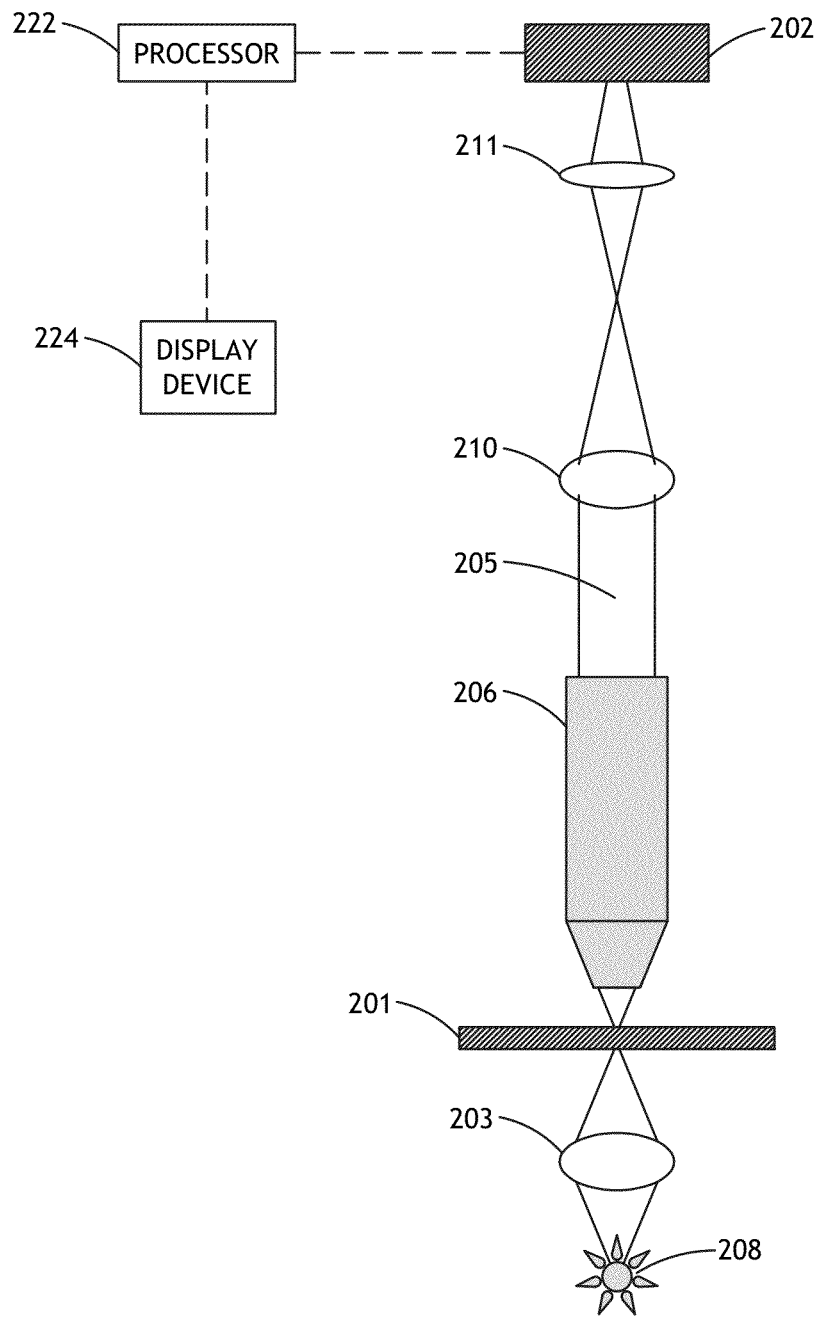
FIG. 2B illustrates a block diagram of a side view of a digital pathology system suitable for color image capture in accordance with the present invention.

Referring now to FIGS. 2A and 2B, the system 200 may include a time delayed integration (TDI) sensor 202, a multicolor filter 204, an objective lens 206, an illumination source 208, a second lens 210 configured to focus image path light onto the TDI sensor 202, and an anamorphic lens 211.

Referring now to FIGS. 2A through 2B, as described previously herein, an illumination source 208 of the present invention may include any illumination source known in the art. The illumination source 208 of the present invention may include, but is not limited to, a bright field illumination system (e.g., utilizing a tissue sample sectioned and mounted on a transparent slide), a dark field illumination system, or a partial oblique illumination system. In one embodiment, the illumination source 208 may include a light source. For example, the light source may be configured to emit broadband light. For instance, the broadband light source may include, but is not limited to, a while light source. By way of another example, the light source may be configured to emit narrow band or monochromatic light. For instance, the light source may include, but is not limited to, a laser or a light emitting diode (LED). Further, narrow band or monochromatic light source may include, but is not limited to, a blue light source, a green light source, or a red light source. The selected wavelength of the light source may depend, among other things, upon measurement requirements and/or specimen features.

As previously described herein, the illumination condenser 203 of the present invention may include any illumination condenser known in the art. In a general sense, the illumination serves to concentrate light from the illumination source 208 and direct the light through the specimen 201 and objective 206. The illumination condenser 203 may include, but is not limited to, an Abbe condenser, an Aplanatic condenser, an Achromatic condenser, or an Aplanatic-achromatic condenser. In the digital pathology setting, the illumination condenser 203 may direct from the illumination source 208 through a tissue specimen 201 mounted on a glass side and through the objective 206. Tissue samples are often prepared by slicing a given tissue sample into thin slices. These thin slices are then mounted onto glass slides, which may be treated with a reagent or stain in order to improve visible contrast.

As previously described herein, the objective 206 of the present invention may include any objective and known in the art. For example, the objective 206 may include, but is not limited to, a catadioptric objective. The objective 206 may be situated such that a first end is located proximate to one or more specimens 201. Further, the objective 206 should be configured to direct light emanating from the specimen 201 (i.e., light transmitting through or light reflecting from the specimen) along an image path to one or more image sensors 202. Upon leaving the objective 206, light emanating from the specimen may be focused to an image sensor 202 utilizing one or more secondary lenses 210. Any known secondary lens known in the art is suitable form implementation in the present invention. For example, any known secondary lens 210 suitable for focusing light from the image path onto the surface of the image sensor 202 is suitable for implementation in the present invention.

Figure 2C:
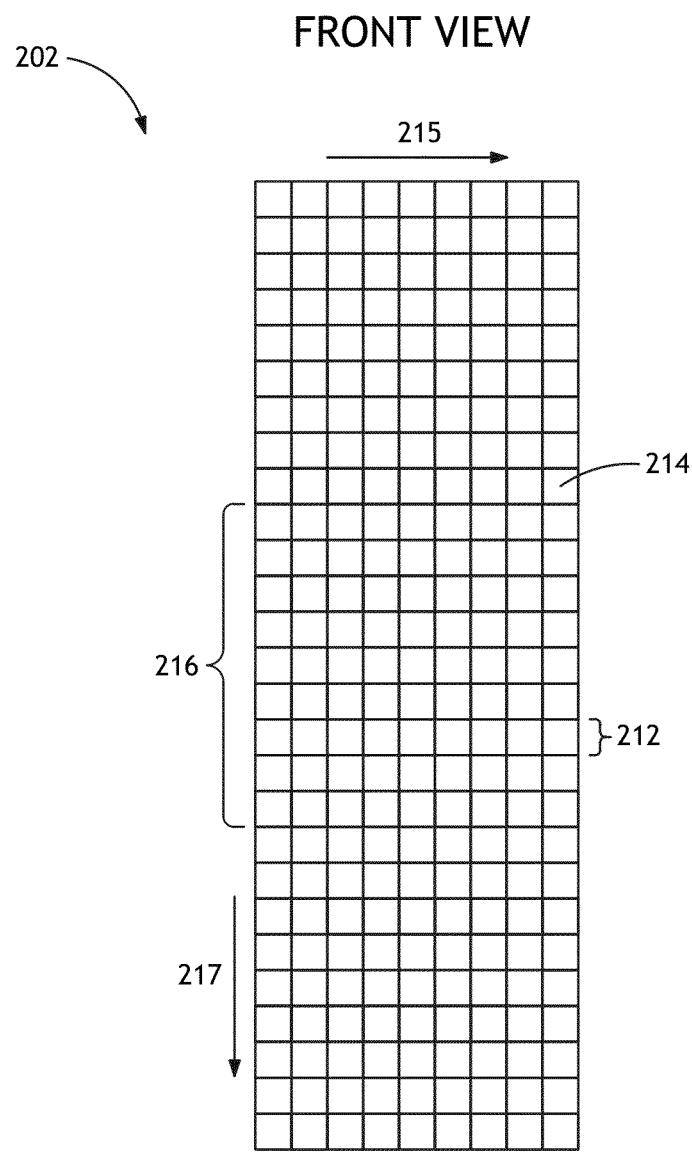
FIG. 2C illustrates a schematic frontal view of a time delay integration (TDI) sensor with pixels having a 1:1 aspect ratio in accordance with the present invention.
Figure 2D:
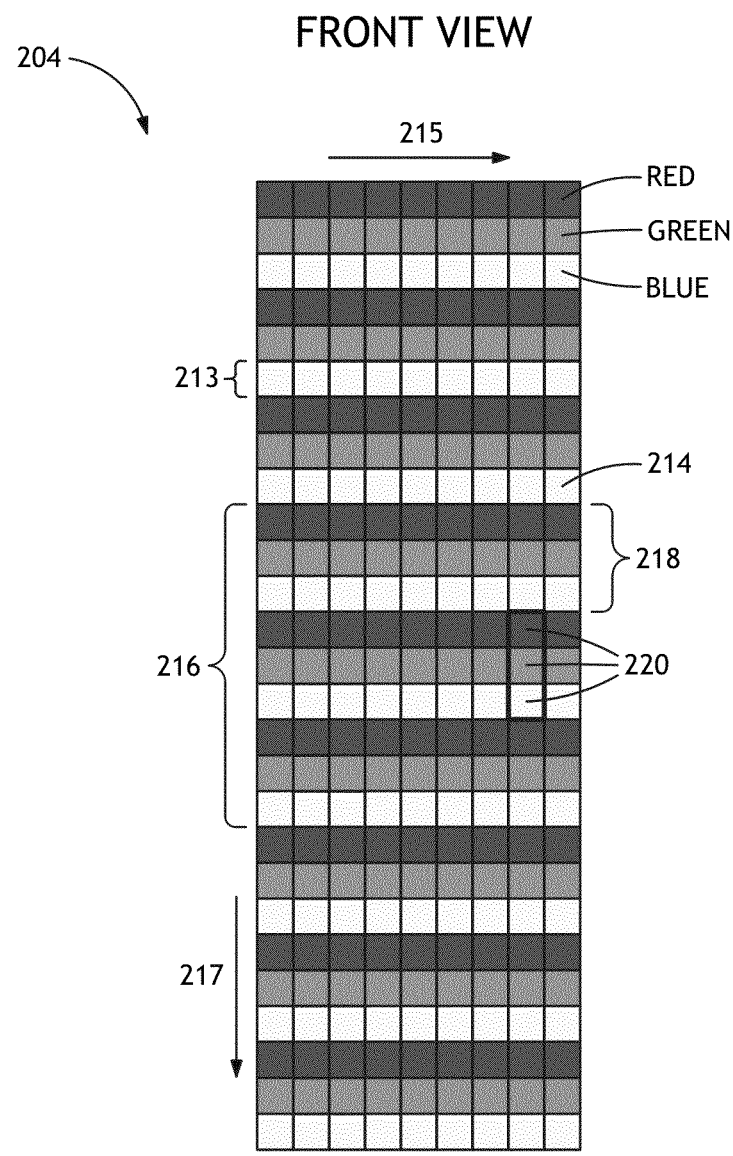
FIG. 2D illustrates a schematic frontal view of a multicolor filter connected to the surface of time delay integration (TDI) sensor with pixels having a 1:1 aspect ratio in accordance with the present invention.
Figure 2D:
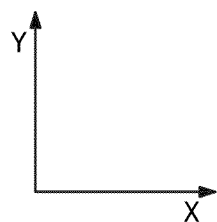

Referring now to FIGS. 2C through 2D, a single TDI sensor 202 may include a set 210 of rows 212 of individual TDI pixels 214. In one embodiment, the individual pixels 214 may have a one-to-one aspect ratio such that the size along the integration direction of the TDI sensor 202 is substantially similar to the size along the non-integrating direction. For instance, as shown in FIG. 2C, the pixels 214 of the TDI sensor 202 may have a width along the integrating direction (e.g., x-direction) of the TDI sensor 202 identical to the height of the pixels 214 along the non-integrating direction (e.g., y-direction) of the TDI sensor 202. It should be recognized that any TDI sensor known in the art is suitable for implementation in the present invention.

In a general sense, in TDI sensors, image photons impinging on a TDI sensor are converted to photocharges in an array of pixels. Moreover, conventional TDI sensors may include a large array of photosensor elements (e.g., CCDs) formed in a grid pattern. For instance, a conventional TDI sensor may be formed in a 2048 by 256 array of photosensor elements. TDI based charge coupled devices (CCDs) are generally described in H. S. Wong et al., "TDI charge-coupled devices: Design and Applications," *IBM Journal of Research and Development*, Vol. 36, pp. 83-106 (1992), which is incorporated herein by reference. Signal processing aspects of an inspection system utilizing TDI sensors is generally described in U.S. patent application Ser. No. 12/575,376, filed on Oct. 7, 2009, which is incorporated herein by reference. Conventional TDI sensors are also described in U.S. Pat. No. 4,580,155, issued on Apr. 1, 1986, U.S. Pat. No. 4,280,141, issued on Jul. 21, 1981, and U.S. Pat. No. 4,382,267, issued on May 3, 1983, which are incorporated herein by reference.

In another aspect of the invention, as shown in FIG. 2D, the TDI sensor 202 may be overlayed by a multicolored filter 204. In one embodiment, the multicolor filter 204 may include a plurality of individual filter lines, wherein each group of three consecutive filter lines includes a first color filter, a second color filter, and a third color filter. For example, as shown in FIG. 2D, the multicolor filter 204 may include alternating lines of a red filter, a green filter and a blue filter. By way of another example, the multicolor filter 204 may include alternating lines of a cyan filter, a yellow filter, and a magenta filter. While red-green-blue based color image processing is quite common, the above description related to red-green-blue filters should not be interpreted as a limitation, but rather an illustration as a variety of other color filter schemes may be applicable. Moreover, it should be recognized that the described system is not limited to a three color filter configuration. Rather, it is contemplated herein that the above described multicolor filter 204 may be extended to include N number of alternating lines of individual filter colors.

In another aspect of the present invention, the multicolor filter 204 may be constructed and arranged such that the height of each filter line 213 has substantially the same height as the individual TDI pixels. For example, as shown in FIGS. 2C and 2D, the color filter lines 213 may have a height which is identical or nearly identical to the height of the rows of pixels 212 of the TDI sensor 202. In this manner, the alternating filter lines 213 of the multicolored filer 204 may be aligned coextensively with the underlying rows 212 of TDI pixels 214 of the TDI sensor 202.

In the case where the individual pixels of row of pixels 212 are bisected by a common axis (as is the case in FIG. 2C) the height of the individual pixels 214 and a row of pixels 212 is substantially similar. It is recognized, however, that the individual pixels 214 of various rows 212 of pixels need not be aligned on a common axis. Rather, it is contemplated herein that the individual pixels 214 of the TDI sensor 202 may reside in a staggered pattern (not shown) with respect to a line bisecting the row of pixels 214 (not shown). In this sense, filter lines 213 of the multicolor filter 204 may be constructed such that they are approximately the same height as the entire height of a staggered row 212 of pixels 214 of the TDI sensor 202.

Figure 2E:
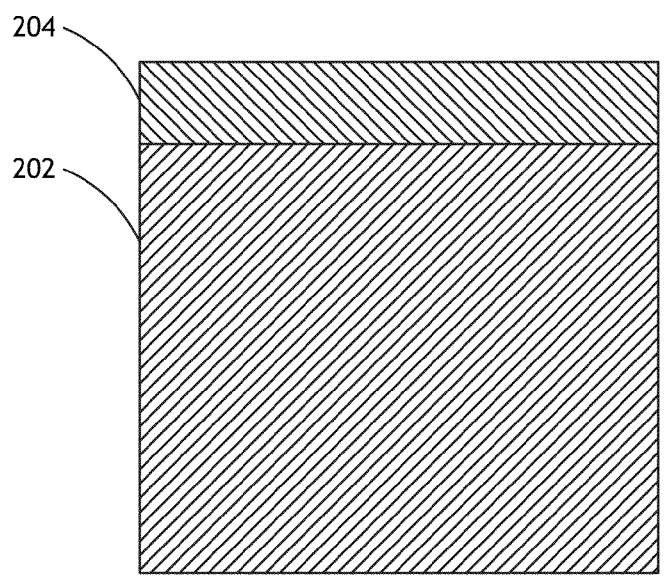

Referring now to FIG. 2E, the multicolored filter 204 may be operably contacted to the surface of the TDI sensor 202. In one embodiment, the color filter lines 213 of the multicolor filter 204 may be deposited onto the surface of the TDI sensor 202 in a manner which creates the alternating color pattern as observe in FIG. 2D. In another embodiment of the present invention, the multicolored filter 204 may be constructed independently from the TDI sensor 202 and then physically affixed to the surface of the TDI sensor 202 utilizing any known method in the art. In another embodiment, the multicolored filter 204 may be constructed independent from the TDI sensor 202 and then aligned and positioned over the TDI sensor 202. In so doing, the filter color lines 213 of the multicolor filter 204 should be aligned with respect to the rows 212 of individual pixels 214 of the underlying TDI sensor 202. Moreover, the multicolor filter 204 may be offset from the surface of the TDI sensor 202 by a fixed distance. It is further contemplated that the multicolor filter 204 may be constructed such that is may be removed from the surface of the TDI sensor 202. In this way, a variety of different color schemed multicolor filters 204 may be utilized depending on the specific needs of the TDI sensor 202 and the subject matter of the imaged specimen.

In a further aspect of the present invention, as illustrated in FIG. 2D, the rows of the alternating color lines 213 and the underlying individual pixels 214 of the TDI sensor 202 may be arranged to create rows 218 of single multicolor integrated pixels 220, as shown in FIG. 2D. In this regard, during a photosensing event a given single multicolor integrated pixel 218 has a single output which indicates either a first color (e.g., red), a second color (e.g., green), or third color (e.g., blue). It is further recognized that the TDI sensor 202 equipped with the multicolor filter 204 may transmit a signal indicative of the sensed event (i.e., color, location, and the like) to the communicatively coupled processor 222.

Referring again to FIG. 2A and FIGS. 2B, the system 200 may include an anamorphic optics element 211. Applicant notes that because the aspect ratio of the individual pixels 214 of the TDI sensor 202 is one-to-one and each of the integrated multicolor pixels 220 are a combination of three individual pixels 214 (as described above), anamorphic optics 211 are required to produce an undistorted image at the image sensor 202. In this regard, an anamorphic optics element 211 may act to magnify the image three fold along the non-integrating direction 217 of the TDI 202 relative to the integrating direction 215 of the TDI. For example, the anamorphic optics element 211 may magnify an image of the specimen 201 three fold in the y-direction (as illustrated on FIGS. 2C and 2D) relative to the x-direction. In doing so, the output of the TDI sensor 202 equipped with the multicolor filter 204 will return to one-to-one relative to the image of the specimen 101.

The anamorphic optics element 211 may include any known anamorphic optical elements known in the art. In one embodiment, the anamorphic optic element 211 may include an anamorphic lens. For example, the anamorphic optics element 211 may include, but is not limited to, a cylindrical lens.

Further, the anamorphic optics element 211 may potentially be located at any position between the specimen 201 and the TDI sensor 202. The only requirement on the anamorphic optics element 211 is that it provides the 3:1 non-integration direction-to-integrating direction magnification as describe above. In one embodiment, as shown in FIG. 2A, the anamorphic optics element 211 may be situated along the image path 205 between the second lens 210 and the TDI sensor 202. In another embodiment (not shown), the anamorphic optics element 211 may be situated along the image path 205 between the objective 206 and the second lens 210. In another embodiment (not shown), the anamorphic optics element 211 may be situated along the image path 205 between the specimen 101 and the objective 206.

Referring again to FIG. 2A, the system 200 may further include a processor 222 communicatively coupled to the TDI sensor 202. In one embodiment, the processor may include in image processing device (not shown). For example, the image processing device may be communicatively couple to the TDI sensor 202. In this regard, the image processing device of the processor 222 may be configured to generate an image of the illuminated specimen 201 utilizing imagery data provided to it by the TDI sensor 202. The imaging processing device may include, but is not limited to, a parallel processing system. Any image processing device known in the art is suitable for implementation in the present invention.

In another embodiment, the processor may be coupled to one or more host computers (not shown). The one or more host computers may be configured to control the operations of the processor 222 and the TDI sensor 202.

In another embodiment, the processor may be communicatively coupled to a display device 224. In this regard, following processing (e.g., processing via image processing device) of imagery data provided by the TDI sensor 202, the processor may transmit the process imagery data to a display device 224. In this manner, the processor 222 may transmit still images of the image specimen 201 or real-time images of the imaged specimen 201.

Figure 3A:
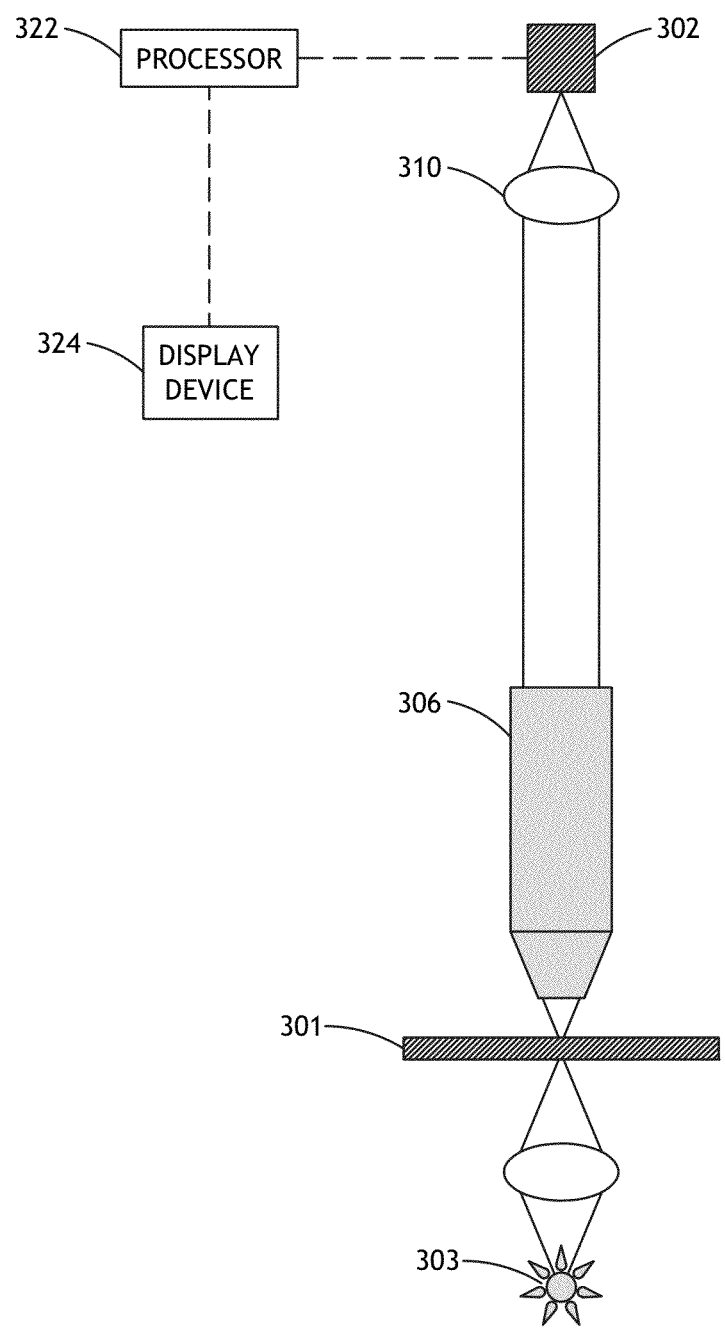
FIG. 3A illustrates a block diagram of a digital pathology system suitable for color image capture in accordance with the present invention.
Figure 3B:
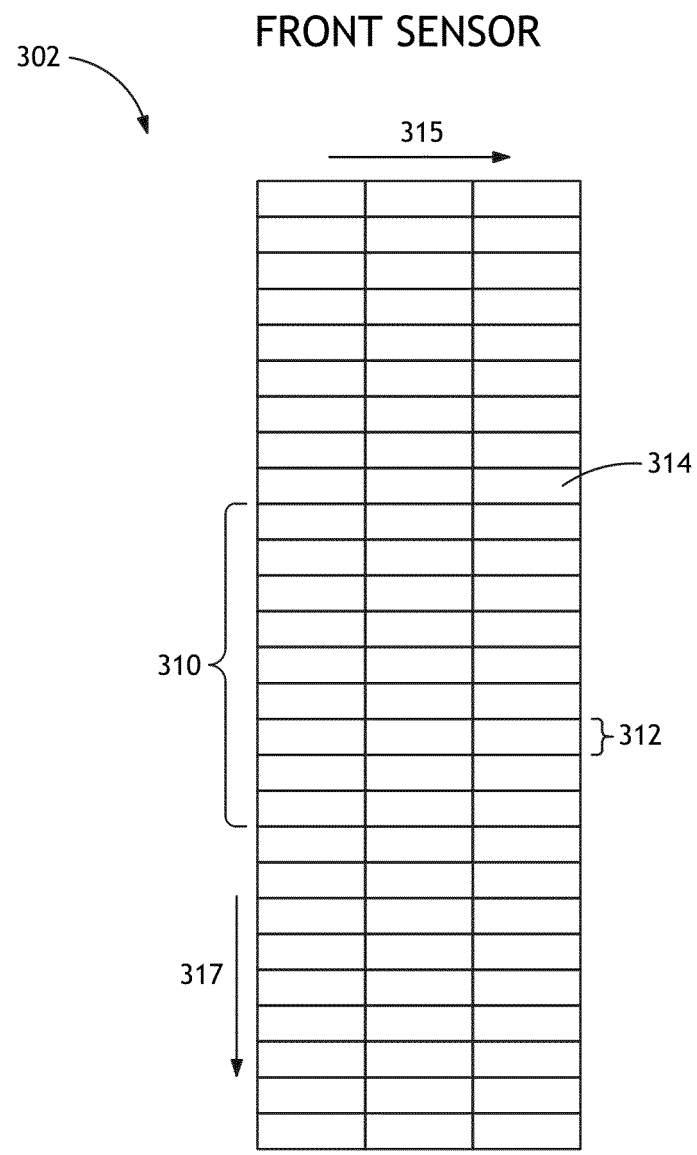
FIG. 3B illustrates a schematic frontal view of a time delay integration (TDI) sensor with pixels having a 3:1 aspect ratio in accordance with the present invention.
Figure 3B:
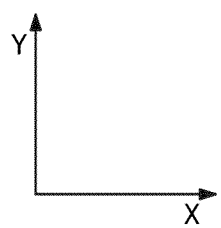
Figure 3C:
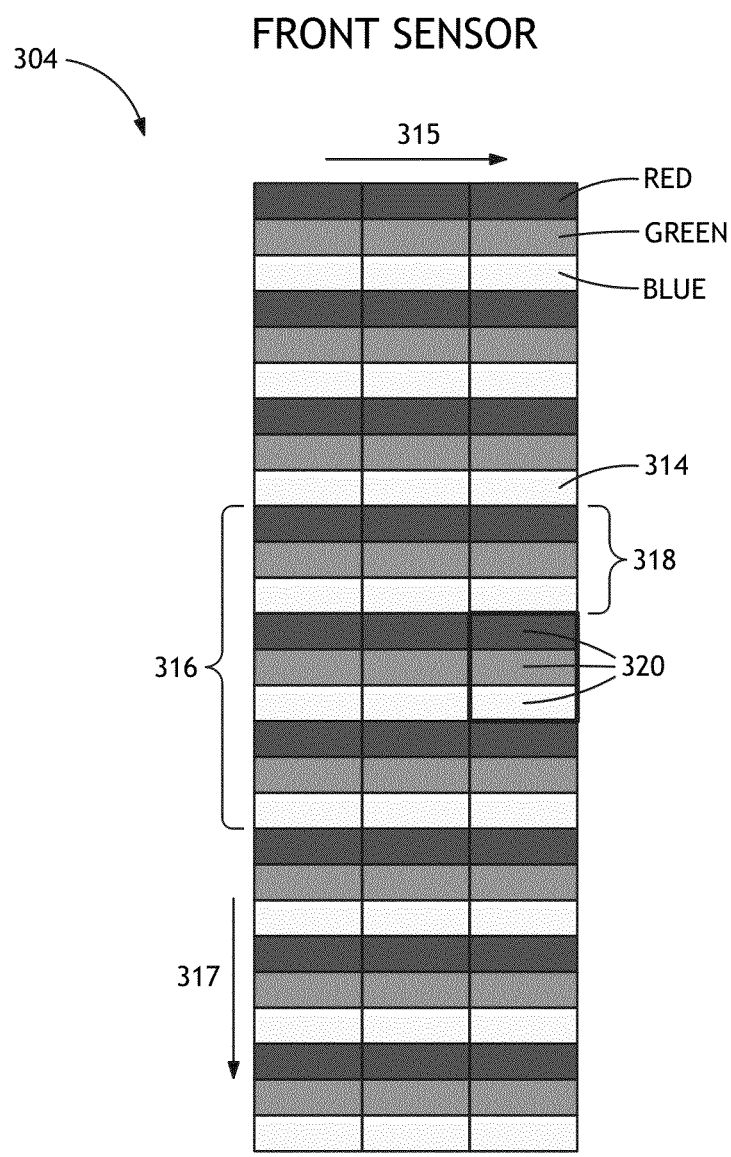
FIG. 3C illustrates a schematic frontal view of a multicolor filter connected to the surface of time delay integration (TDI) sensor with pixels having a 3:1 aspect ratio in accordance with the present invention.

Referring generally to FIGS. 3A through 3C, an alternative system 300 suitable for multicolor digital pathology is described in accordance with the present invention.

As in system 200 described previously herein, the system 300 may include a time delayed integration (TDI) sensor 302, a multicolor filter 304, an objective lens 306, an illumination source 308, and a second lens 310 configured to focus image path light onto the TDI sensor 202. The previous provided description of system 200, as it applies to the above and other common elements, should be interpreted to apply to system 300.

Referring now to FIGS. 3B and 3C, a single TDI sensor 302 may include a set 310 of rows 312 of individual TDI pixels 314. In one embodiment, the individual pixels 314 may have a three-to-one aspect ratio such that the size along the integration direction of the TDI sensor 302 is approximately three times the size along the non-integrating direction. For instance, as shown in FIG. 3B, the pixels 314 of the TDI sensor 302 may have a width along the integrating direction (e.g., x-direction) of the TDI sensor 302 three times the height of the pixels 314 along the non-integrating direction (e.g., y-direction) of the TDI sensor 302. It should be recognized that any TDI sensor known in the art is suitable for implementation in the present invention.

As shown in FIG. 3C, and as discussed previously with respect to system 200, the TDI sensor 302 may be overlayed with a multicolored filter 304. In one embodiment, the multicolor filter 304 may include a plurality of individual filter lines, wherein each group of three consecutive filter lines includes a first color filter, a second color filter, and a third color filter. For example, as shown in FIG. 3C, the multicolor filter 304 may include alternating lines of a red filter, a green filter and a blue filter. While red-green-blue based color image processing is quite common, the above description related to red-green-blue filters should not be interpreted as a limitation, but rather an illustration as a variety of other color filter schemes may be applicable. Moreover, it should be recognized that the described system is not limited to a three color filter configuration. Rather, it is contemplated herein that the above described multicolor filter 304 may be extended to include N number of alternating lines of individual filter colors.

Applicant notes that because the aspect ratio of the individual pixels 314 of the TDI sensor 302 is three-to-one and each of the integrated multicolor pixels 320 are a combination of three individual pixels 314 (as described above), no special anamorphic optics are required to produce an undistorted image at the image sensor 302. In particular, due to the distorted individual pixels 314 (i.e., 3:1 aspect ratio), the aspect ratio of the single multicolor integrated pixel 220 is one-to-one. In this regard, system 300 represents an alternative to the design in system 200. Systems 200 and 300 both include single multicolor TDI sensors, which provide undistorted images at an image sensor.

All of the system and methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

Furthermore, it is to be understood that the invention is defined by the appended claims.

What is claimed:
1. An autofocusing digital pathology system, comprising:
an illumination source configured to illuminate one or more specimens;
an objective having a first end positioned proximate to the one or more specimens, wherein the objective is config- ured to direct at least a portion of light emanating from the one or more specimens along an image path to one or more image sensors;
an autofocus controller;
a specimen Z height motor communicatively coupled to the autofocus controller;
a first sharpness sensor and a second sharpness sensor, wherein one more optical elements are configured to redirect a portion of light along the image path onto a first focus path toward the first sharpness sensor, wherein the one or more optical elements are further configured to redirect a portion of light along the first focus path onto a second focus path toward the second sharpness sensor;
wherein the first sharpness sensor comprises: a first lens configured to focus light of the first focal path to a first pupil plane of the first sharpness sensor, wherein the first pupil plane is offset in Z position by a selected distance relative to a predetermined best focus position along a first direction; a first apodizing filter located at the first pupil plane; and a first light sensor arranged to collect light transmitted by the first apodizing filter, wherein the first light sensor is configured to transmit a signal indicative of measured intensity of the light via the first light sensor to the autofocus controller,
wherein the second sharpness sensor comprises: a second lens configured to focus light of the second focal path to a second pupil plane of the second sharpness sensor, wherein the second pupil plane is offset in Z position by the selected distance relative to the predetermined best focus position along a second direction, wherein the second direction is opposite to the first direction; a second apodizing filter located at the second pupil plane, wherein the first apodizing filter and the second apodizing filter are configured to operate as high pass filters; and a second light sensor arranged to collect light transmitted by the second apodizing filter, wherein the second light sensor is configured to transmit a signal indicative measured intensity of the light via the second light sensor to the autofocus controller,
wherein the autofocus controller is configured to determine the best object Z focus height by interpolating the sharpness versus Z offset data constructed utilizing the measured light intensity from the first light sensor and second light sensor, wherein the autofocus controller is configured to control the object focus by controlling the Z height motor in order to maintain focus error below a selected threshold.

2. The system of claim 1, wherein at least one of the first light sensor or the second light sensor comprise:
a single diode, a single pixel of a charge coupled device (CCD), or a single pixel of a time delay integration (TDI) CCD.

3. The system of claim 1, wherein at least one of the first apodizing filter or the second apodizing filter comprises:
an apodizing filter having a graduated transmission profile, wherein transmission increases as a function of distance from a center of symmetry of the apodizing filter.

4. The system of claim 1, wherein intensity of light of image path is substantially greater than intensity of light of first focus path.

5. The system of claim 1, wherein intensity of light of first focus path is substantially similar to the intensity of light of second focus path.

6. The system of claim 1, further comprising:
at least one additional sharpness sensor, wherein the at least one additional sharpness sensor includes at least one additional pupil plane, at least one additional apodizing filter located at the at least one additional pupil plane, and at least one additional light sensor.

7. The system of claim 1, further comprising:
a normalization light sensor configured to measure the intensity of the light along the first focus path following emanation from the first beam splitter in order to normalize the measured intensity at the first light sensor and the second light sensor.

8. The system of claim 1, further comprising:
an illumination condenser.

9. The system of claim 1, wherein the one or more specimens are mounted on a substantially transparent slide.

10. A digital pathology system suitable for color image capture, comprising:
an illumination source configured to illuminate one or more specimens;
a time delayed integration (TDI) sensor having a plurality of rows of TDI pixels, wherein each of the TDI pixels have a substantially one-to-one aspect ratio;
a multicolor filter operably contacted to a surface of the TDI sensor, wherein the multicolor filter has alternating sections of a first color filter, a second color filter, and at least a third color, wherein each of the alternating sections of the multicolor filter is substantially coextensive along at least one dimension with at least one of the rows of the TDI pixels, wherein adjacent rows of TDI pixels are grouped in order to form a plurality of rows of integrated multicolor pixels;
an objective having a first end positioned proximate to the one or more specimens, wherein the objective is configured to direct at least a portion of light emanating from the one or more specimens along an image path to the TDI sensor;
a second lens configured to focus light from the image path onto a portion of the TDI sensor; and
an anamorphic optics element configured to magnify an image of the one or more specimens such that the image is magnified by a factor of three along a direction orthogonal to an integrating direction of the TDI sensor.

11. The system of claim 10, wherein the first color includes red, the second color includes green, and the third color includes blue.

12. The system of claim 10, wherein the anamorphic optics element is positioned between the second lens and the TDI sensor.

13. The system of claim 10, wherein the anamorphic optics element is positioned between the objective and the second lens.

14. The system of claim 10, wherein the anamorphic optics element is positioned between the one or more specimens and the objective.

15. The system of claim 10, wherein the anamorphic optics element comprises:
an anamorphic lens.

16. The system of claim 10, wherein the anamorphic lens comprises:
a cylindrical lens.

17. The system of claim 10, wherein the multicolor filter is affixed to the surface of the TDI sensor.

18. The system of claim 10, wherein the multicolor filter is detachably connected to the surface of the TDI sensor.

19. The system of claim 10, wherein the multicolor filter is suspended at a fixed distance above the surface of the TDI sensor.

20. The system of claim 10, further comprising:
a processor communicatively coupled to the TDI sensor.

21. The system of claim 20, further comprising:
a display device communicatively coupled to the processor.

22. A digital pathology system suitable for color image capture, comprising:
- an illumination source configured to illuminate one or more specimens;
- a time delayed integration (TDI) sensor having a plurality of rows of TDI pixels, wherein each of the TDI pixels have a substantially three-to-one aspect ratio, wherein the dimension of each of the TDI pixels along an integrating direction of the TDI sensor is three times larger than the dimension along a direction orthogonal to the integrating direction;
- a multicolor filter operably contacted to a surface of the TDI sensor, wherein the multicolor filter has alternating sections of a first color filter, a second color filter, and at least a third color, wherein each of the alternating sections of the multicolor filter is substantially coextensive along at least one dimension with at least one of the rows of the TDI pixels, wherein adjacent rows of TDI pixels are grouped in order to form a plurality of rows of integrated multicolor pixels;
- an objective having a first end positioned proximate to the one or more specimens, wherein the objective is configured to direct at least a portion of light emanating from the one or more specimens along an image path to the TDI sensor; and
- a second lens configured to focus light from the image path onto a portion of the TDI sensor.

* * * * *